Sept. 28, 1965
L. OSROW
3,208,142
HEATED KNIFE
Filed March 20, 1964
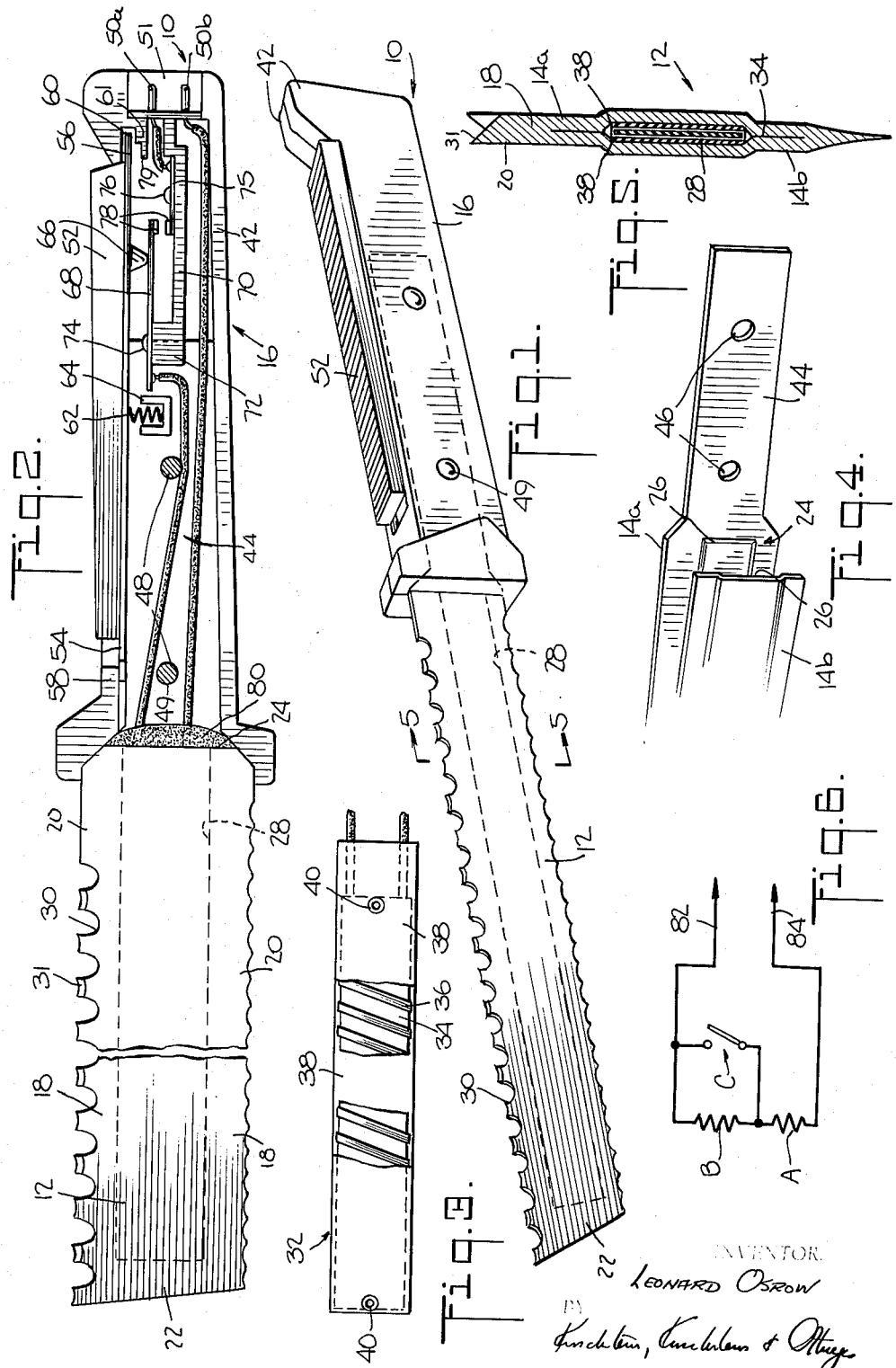
INVENTOR.
LEONARD OSROW
BY
Kirschstein, Kirschstein & Ottinger
ATTORNEYS United States Patent Office 3,208,142
Patented Sept. 28, 1965

3,208,142
HEATED KNIFE
Leonard Osrow, Great Neck, N.Y., assignor to Osrow Products Company, Inc., Glen Cove, N.Y., a corporation of New York
Filed Mar. 20, 1964, Ser. No. 353,541
12 Claims. (Cl. 30—140)

This invention relates to a novel heated knife of the type used for cutting frozen foods and the like.

It is a principal object of the present invention to provide a knife of the character described having a heating element which is wholly disposed in and ensheathed by the blade of the knife and hermetically sealed at the cutting edges thereof and which is still capable of having said cutting edges deeply notched for facile sawing of frozen foods without destroying said seal.

It is another object of the present invention to provide a knife of the character described wherein the heating element is wholly hermetically sealed within the blade.

It is another object of the present invention to provide a knife of the character described wherein an electrical grip-operated switch is provided in the handle for controlling the heating element.

It is another object of the present invention to provide a knife of the character described which is extremely simple to use.

It is another object of the present invention to provide a knife of the character described which can be manufactured from inexpensive materials and is readily adapted to mass production methods.

It is another object of the present invention to provide a knife of the character described which is rugged and long-lasting.

These and various other objects and advantages of the invention will become apparent in the following description.

The invention accordingly consists in the features of construction, combinations of elements and arrangements of parts which will be exemplified in the devices hereinafter described and of which the scope of application will be indicated in the appended claims.

In the accompanying drawings in which are shown two of the various possible embodiments of the invention, FIG. 1 is an isometric side view of a heated knife embodying the instant invention;

FIG. 2 is a fragmentary side view of the knife, the handle being shown with one half thereof removed to reveal the electrical switch contained therewithin;

FIG. 3 is a partially broken away plan view of the heating element of the knife showing the construction thereof;

FIG. 4 is a fragmentary side isometric view of two metal plates to be welded together to form the knife blade, the same being shown prior to welding;

FIG. 5 is an enlarged sectional view taken substantially along the line 5—5 of FIG. 1; and FIG. 6 is a circuit diagram showing the heating circuit for a modified form of the invention.

Referring now in detail to the drawings, the reference numeral 10 denotes a heated knife constructed in accordance with the present invention. Said knife includes a blade 12 fabricated from two elongated flat coextensive sheet metal plates 14a and 14b (see FIG. 4) welded together as set forth hereinafter. Said plates are preferably fabricated from stainless steel. Said knife also includes a hollow elongated handle 16 composed of a suitable plastic such as a threaded phenol formaldehyde condensation resin.

Pursuant to the instant invention, the two elongated plates 14a and 14b are hermetically joined together along the facing longitudinal edge borders and one pair (the tip) of facing end borders thereof by a wide band 18 of continuous welding (see FIGS. 1 and 2). Any suitable mode of welding may be employed, e.g. overlapping spot resistance welding, seam resistance welding, gas or electric deposit welding, brazing or soldering. It is critical to the invention that the weld band be at least a quarter of an inch wide and constitute both longitudinal marginal edge zones 20 and the tip end marginal edge zone 22 of the blade. The other ends of the plates form an unwelded end 24 of the blade which end may or may not be sealed as will appear hereinafter.

Each plate includes an elongated wide shallow depressed pocket 26 defined by the inner edge of the band 18 and coextensively facing the pocket of the other plate. The pockets together form a well 28 extending from the tip of the blade to the unwelded end thereof.

At least one and preferably both longitudinal edges of the blade are sharpened, and, pursuant to the instant invention, at least one such edge is provided with a series of deep notches 30. The wide band 18 permits the blade to be deeply notched (approximately ⅛″) without destroying the hermetic seal between the plates at the longitudinal marginal edge zones thereof, but the notch must be no deeper than the band is wide. The resultant teeth 31 have their broad tips sharpened with alternate tips chamfered on opposite faces of the teeth (see FIGS. 1, 2 and 5) to provide most efficient sawing action on frozen foods.

Since the heating element is disposed within the blade, as will be described below, and since the blade will come into contact with liquids, the hermetic seal between the plates along the longitudinal marginal edge zones and the tip of the blade must be preserved when the deep notches 31 are cut out of the longitudinal edges of the blade; otherwise, liquid could flow into the well and short circuit the heating element.

An elongated wide flat electrical resistance heating element 32 is disposed within the well. Said element is conventional and can be of the wound wire type as shown in FIG. 3. The heating element includes an elongated broad flat sheet 34 of mica having notches along the longitudinal edges thereof. A ribbon shaped resistance wire 36 is spirally wound around this sheet. The opposite broad faces of the sheet 34 are covered by substantially coextensive slightly wider and somewhat longer mica sheets 38, and the three sheets are held together by appropriately located rivets 40.

The ends of the wire 36 extend out of the unwelded end 24 of the well 28 and into the hollow interior of the handle 16. Said handle is formed by two facing concave shells 42 joined to one another in the fashion hereinafter described. The plate 14a of the blade includes at the unwelded end thereof an integral handle mounting shank 44 projecting in the direction opposite from the tip 22 of the knife. Said shank is received between the shells 42 of the handle and includes two spaced openings 46. Said openings are registered with similar openings 48 in the handle shells, and the handle is affixed to the handle mounting shank by rivets 49 inserted through said openings 46 and 48.

The handle is provided with terminal pins 50a and 50b contained in a socket 51 at the end thereof remote from the tip 22 of the knife. Each end of the resistance wire 36 is electrically connected to a different terminal pin. The heating element is energized by coupling a source of electricity to the terminal pins 50a and 50b, as by a plug (not shown) which in turn is connected to a conventional source of electric power.

In the embodiment of the invention shown in FIG. 2, an electrical grip-operable normally open momentary switch is provided in the handle for turning the heating element on and off. For this purpose an elongated electrically non-conductive actuating member 52 longitudinally shiftable with respect to the handle is provided on one longitudinal edge of the handle (the top edge as viewed in FIG. 2). Said member includes a flat flange 54 at the end thereof proximate to the tip of the knife blade and a similar flange 56 at the opposite end thereof remote from the tip of the blade. Each flange is captively slidably held beneath an associated overhang 58, 60, respectively, formed in the handle, whereby the actuating member is shiftable longitudinally between an operable position proximate to the tip of the knife and a locked idle position remote from the tip of the knife. The overhang 58 is associated with the flange 54, and the overhang 60 is associated with the flange 56. A step 61 is provided in the handle at the end thereof remote from the tip of the knife. Said step is parallel to the overhang 60 and is located beneath the flange 56 when the actuating member 52 is in its remote (locked) position. The step, however, is not long enough to extend beneath the flange 56 when the member 52 is in its proximate (operable) position.

The actuating member 52 is upwardly biased so that the flanges abut their associated overhangs by a vertically oriented compression coil spring 62 disposed in compressed condition between the undersurface of the member 52 and an upwardly facing spring mounting cup 64 formed in the handle. The spring is located approximately midway between the flanges 54 and 56 so that the upward pressure of the spring is substantially equally effective with respect to both ends of the member 52.

Between the spring and the flange 56 a downwardly facing boss 66 is formed on the actuating member. Said boss engages a first terminal of the switch that comprises a flat strip 68 of electrically conductive resilient material such as Phosphor bronze which is anchored at a point between the coil spring and the boss. More specifically, an elongated, longitudinally disposed electrically non-conductive mounting element 70 for both terminals of the switch is formed in the handle. Said mounting element includes a flat upwardly facing shoulder 72 at the end thereof proximate to the tip of the knife. The strip 68 is anchored, as by a screw 74, on said shoulder with a major portion of the strip projecting toward the remote end of the handle. The remote end of the strip 68 extends beneath the boss 66. A second terminal for the switch comprises a second flat strip 75 similar to strip 68 and disposed beneath said remote end of strip 68 in overlapping relationship thereto. Said strip 75 is secured, as by a screw 76, to the mounting element 70. A contact button 78 is provided on the overlapping ends of each strip, said buttons being disposed on the facing surfaces of the strips.

One end of the wire ribbon 36 is connected to the strip 68, and the other end is directly connected to terminal pin 50b of the handle. The strip 75 is connected to the terminal 50a of the handle. Thus, the switch is in series with wire ribbon 36, and the circuit is not closed unless the strips 68 and 75 are in electrical contact with one another. Such contact is made by longitudinally moving the shiftable actuating member 52 from its remote position to its proximate position and then squeezing the handle in the user's grip so as to press the actuating member into the handle and thereby force the boss 66 and so the strip 68 in the direction of the strip 75. In this way the contact buttons of both strips are made to touch one another and complete the circuit. A stop 79 is provided below and adjacent the step 61, said stop being located nearer to the knife tip 22 than the step 61. The stop is positioned so that it is beneath the flange 56 when the actuating member 52 is in its proximate position. Said stop serves to prevent movement of the member 52 too far into the handle, i.e., to such an extent as to deform the strip 68.

The coil spring 62 opens the circuit upon release of the actuating member 52. The actuating member may then be slid to its position remote from the knife tip in which it is locked against accidental movement into the handle whereby inadvertent actuation of the switch is prevented.

Although the grip-operable actuating member has been shown and described as being located on the top longitudinal edge of the handle, it could be located in the bottom longitudinal edge thereof or along one of the broad vertical sides, this being a matter of design and convenience.

The open end of the well, i.e., the end 24 of the blade from which the ends of the wire 36 project, is hermetically sealed by a suitable means such as a body 80 of epoxy resin. This permits the entire knife to be immersed in liquids without danger of injury to the heating element.

In FIG. 6 a circuit is shown for a modified form of the invention wherein the heating element is always "on" at a low heat as long as the terminal pins 50a, 50b are connected to a source of electric power, and wherein actuation of the switch is required to supply the high heat desired in the use of the knife. For this purpose, a high resistance is provided in series with the heating element, and the normally open momentary switch is so connected in the circuit that closing of the switch will shunt out this high resistance. Such additional resistance decreases the flow of current through the heating element sufficiently so that the heating element only becomes warm, but on shunting out of the additional resistance, the current through the heating element is increased sufficiently to produce the desired high temperature.

In the circuit shown in FIG. 6, the reference numeral 82 denotes one input end and the reference numeral 84 designates the other input end. The principal heating resistance (the ribbon wire 36) which resistance provides the high temperature heat for operation of the knife is denoted by the reference letter A, and the additional high resistance is denoted by the reference letter B. The reference letter C designates the normally open momentary switch. The resistances A and B are connected in series between the input ends 82, 84. The switch is connected across the high resistance B so that with the switch in its normally open position (as shown in FIG. 6) the resistance B drastically reduces the current flowing through the circuit. On closing of switch C, the resistance B is shorted out so that only the resistance A remains in circuit and it accordingly becomes much hotter. Resistances A and B are double wound on thin sheets of electrically non-conductive material located in the well of the knife blade with a tap between the resistances brought out for connection to the switch so that it can be wired up as shown in FIG. 6.

It will thus be seen that there has been provided a heated knife in which the several objects of the invention are achieved and which is well adapted to meet the conditions of practical use.

As various possible embodiments might be made of the above invention and as various changes might be made in the embodiments above set forth, it is understood that all matter herein described or shown in the accompanying drawings is to be interpreted as illustrative and not in a limiting sense.

Having thus described the instant invention, there is claimed as new and desired to secure by Letters Patent,

1. A heated knife for cutting frozen foods and the like, said knife comprising a blade and a handle attached thereto, said blade comprising two elongated, flat sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip end marginal edge zone constituting a continuous band of substantial width, at least one longitudinal edge of the blade being sharpened and deeply notched within the welded band, each plate including a shallow pocket defined by the welded longitudinal and tip end marginal edge zones thereof, the pockets of said plates facing one another to form a well extending from the tip end edge of the blade to the unwelded end edges of the plates, a flat elongated electrical resistance heating element wholly disposed in and ensheathed by said well and extending substantially throughout the length of the blade, a handle mounting shank integral with the unwelded end edge of one plate and extending into the handle, means securing the handle to said shank, electrical terminals in the handle, and electrical conducting means connecting the heating element to the electrical terminals, said conducting means extending out of the well at the unwelded end edges of the plates and into the handle.

2. A heated knife as set forth in claim 1 wherein the welded band is at least one quarter of an inch wide.

3. A heated knife for cutting frozen foods and the like, said knife comprising a blade and a handle attached thereto, said blade comprising two elongated, flat stainless steel sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip end marginal edge zone constituting a continuous band of substantial width, at least one longitudinal edge of the blade being sharpened and deeply notched within the welded band, each plate including a shallow pocket defined by the welded longitudinal and tip end marginal edge zones thereof, the pockets of said plates facing one another to form a well extending from the tip end edge of the blade to the unwelded end edges of the plates, a flat elongated electrical resistance heating element wholly disposed in and ensheathed by said well and extending substantially throughout the length of the blade, a handle mounting shank integral with the unwelded end edge of one plate and extending into the handle, means securing the handle to said shank, electrical terminals in the handle, and electrical conducting means connecting the heating element to the electrical terminals, said conducting means extending out of the well at the unwelded end edges of the plates and into the handle.

4. A heated knife for cutting frozen foods and the like, said knife comprising a blade and a handle attached thereto, said blade comprising two elongated, flat sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip end marginal edge zone of the blade, the weld forming said longitudinal marginal edge zones and tip end marginal edge zone constituting a continuous band of substantial width, both longitudinal edges of the blade being sharpened and one edge being deeply notched within the welded band, each plate including a shallow pocket defined by the welded longitudinal and tip end marginal edge zones thereof, the pockets of said plates facing one another to form a well extending from the tip end edge of the blade to the unwelded end edges of the plates, a flat elongated electrical resistance heating element wholly disposed in and ensheathed by said well and extending substantially throughout the length of the blade, a handle mounting shank integral with the unwelded end edge of one plate and extending into the handle, means securing the handle to said shank, electrical terminals in the handle, and electrical conducting means connecting the heating element to the electrical terminals, said conducting means extending out of the well at the unwelded end edges of the plates and into the handle.

5. A heated knife for cutting frozen foods and the like, said knife comprising a blade and a handle attached thereto, said blade comprising two elongated flat sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip end marginal edge zone of the blade, the weld forming said longitudinal marginal edge zones and tip end marginal edge zone constituting a continuous band of substantial width, at least one longitudinal edge of the blade being sharpened, each plate including a shallow pocket defined by the welded longitudinal and tip end marginal edge zones thereof, the pockets of said plates facing one another to form a well extending from the tip end edge of the blade to the unwelded end edges of the plates, a flat elongated electrical resistance heating element wholly disposed in and ensheathed by said well and extending substantially throughout the length of the blade, a handle mounting shank integral with the unwelded end edge of one plate and extending into the handle, means securing the handle to said shank, electrical terminals in the handle, electrical conducting means connecting the heating element to the electrical terminals, said conducting means extending out of the well at the unwelded end edges of the plates and into the handle, and a manually operable normally open momentary switch located in the handle to control the electrical heating element.

6. A knife as set forth in claim 5 wherein the switch is operable by squeezing the handle.

7. A knife as set forth in claim 5 wherein the switch is actuated by an element shiftable longitudinally of the handle between an idle locked position and an operable position.

8. A knife as set forth in claim 1 wherein the electrical heating element is hermetically sealed within the well by a body of electrically non-conductive material disposed at the unwelded end edges of the plates.

9. A heated knife for cutting frozen foods and the like, said knife comprising a blade and a handle attached thereto, said blade comprising two elongated, flat sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip end marginal edge zone constituting a continuous band of substantial width, at least one longitudinal edge of the blade being sharpened and deeply notched within the welded band, each plate including a shallow pocket defined by the welded longitudinal and tip end marginal edge zones thereof, the pockets of said plates facing one another to form a well extending from the tip end edge of the blade to the unwelded end edges of the plates, a flat elongated electrical resistance heating element wholly disposed in and ensheathed by said well and extending substantially throughout the length of the blade, a handle mounting shank integral with the unwelded end edge of one plate and extending into the handle, means securing the handle to said shank, and means to energize said heating element.

10. A heated knife for cutting frozen foods and the like, said knife comprising a blade and a handle attached thereto, said blade comprising two elongated, flat sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip end marginal edge zone constituting a continuous band of substantial width, at least one longitudinal edge of the blade being sharpened and deeply notched within the welded band, the welded longitudinal and end marginal edge zones of the plate defining a well extending from the tip end edge of the blade to the unwelded end edges of the plates, a flat elongated electrical resistance heating element wholly disposed in and ensheathed by said well and extending substantially throughout the length of the blade, a handle mounting shank integral with the unwelded end edge of one plate and extending into the handle, means securing the handle to said shank, and means to energize said heating element.

11. A heated knife for cutting frozen foods and the like, said knife comprising a blade and a handle attached thereto, said blade comprising two elongated, flat sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip and marginal edge zone constituting a continuous band of substantial width, at least one longitudinal edge of the blade being sharpened and deeply notched within the welded band, each plate including a shallow pocket defined by the welded longitudinal and end marginal edge zones thereof, the pockets of said plates facing one another to form a well extending from the tip end edge of the blade to the unwelded end edges of the plates, a flat elongated electrical resistance heating element disposed in said well, a handle mounting shank integral with the unwelded end edge of one plate and extending into the handle, means securing the handle to said shank, and means to energize said heating element.

12. A heated knife for cutting frozen foods and the like, said knife comprising a blade and a handle attached thereto, said blade comprising two elongated, flat sheet metal plates disposed in face-to-face relation, each plate having two longitudinal edges and two end edges, said plates being hermetically welded to one another along both facing longitudinal edge borders thereof and along only one pair of facing end edge borders thereof whereby to form two longitudinal marginal edge zones and a tip end marginal edge zone constituting a continuous band of substantial width, at least one longitudinal edge of the blade being sharpened and deeply notched within the welded band, the welded longitudinal and end marginal edge zones of the plate defining a well extending from the tip end edge of the blade to the unwelded end edges of the plates, a flat elongated electrical resistance heating element disposed in said well, a handle mounting shank integral with the unwelded end edge of one plate and extending into the handle, means securing the handle to said shank, and means to energize said heating element.

References Cited by the Examiner

UNITED STATES PATENTS

| | | | |
|---|---|---|---|
| 2,750,669 | 6/56 | Hohmann | 30—355 |
| 2,941,292 | 6/60 | Mirando et al. | 30—165 |
| 2,960,592 | 11/60 | Pierce | 30—140 |

FOREIGN PATENTS

| | | |
|---|---|---|
| 671,272 | 4/52 | Great Britain. |

WILLIAM FELDMAN, *Primary Examiner.*